United States Patent
Yan et al.

(10) Patent No.: US 12,542,307 B2
(45) Date of Patent: Feb. 3, 2026

(54) METHOD AND APPARATUS FOR QUANTITATIVE ANALYSIS OF BATTERY PERFORMANCE, AND ELECTRONIC DEVICE THEREWITH

(71) Applicant: SHANGHAI MAKESENS ENERGY STORAGE TECHNOLOGY CO., LTD., Shanghai (CN)

(72) Inventors: Xiao Yan, Shanghai (CN); Zihan Yuan, Shanghai (CN); Danfei Gu, Shanghai (CN)

(73) Assignee: SHANGHAI MAKESENS ENERGY STORAGE TECHNOLOGY CO., LTD., Shanghai (CN)

( * ) Notice: Subject to any disclaimer, the term of this patent is extended or adjusted under 35 U.S.C. 154(b) by 582 days.

(21) Appl. No.: 18/089,770

(22) Filed: Dec. 28, 2022

(65) Prior Publication Data
US 2023/0207907 A1   Jun. 29, 2023

(30) Foreign Application Priority Data
Dec. 28, 2021   (CN) .......................... 202111632188.8

(51) Int. Cl.
*H01M 10/44* (2006.01)
*G01R 31/382* (2019.01)
(Continued)

(52) U.S. Cl.
CPC ........ *H01M 10/441* (2013.01); *G01R 31/382* (2019.01); *G01R 31/389* (2019.01);
(Continued)

(58) Field of Classification Search
CPC .............. H01M 10/441; H01M 10/482; G01R 31/389; G01R 31/392; G01R 31/386;
(Continued)

(56) References Cited

U.S. PATENT DOCUMENTS

| 2008/0071467 A1 * | 3/2008 | Johnson .................. H04L 67/12 701/119 |
| 2012/0019061 A1 * | 1/2012 | Nishihara ........... H01M 10/482 429/7 |

(Continued)

FOREIGN PATENT DOCUMENTS

CN   108270230   *   7/2018   ................ H02J 3/32

*Primary Examiner* — Catherine T. Rastovski
*Assistant Examiner* — Sharah Zaab
(74) *Attorney, Agent, or Firm* — troutman pepper locke; Tim Tingkang Xia, Esq.

(57) ABSTRACT

The invention discloses method and apparatus for quantitative analysis of battery performance and an electronic device. The method includes performing a full charging/discharging process on a to-be-analyzed battery cluster, and determining differential capacities versus voltage of a plurality of cells in the battery cluster at different times; determining first times and first states of charge (SOC) when the differential capacities versus voltage of the cells reach a first peak and second times and second SOCs when the differential capacities versus voltage of the cells reach a second peak, and determining capacity parameters of the cells; and performing quantitative analysis on the battery cluster according to the capacity parameters of the plurality of cells. Accordingly, the battery cluster does not need to be disassembled. The capacity parameters can be quickly and accurately determined through a full charging/discharging process. The method requires can realize relatively accurate quantitative analysis for the battery cluster.

10 Claims, 9 Drawing Sheets

(51) Int. Cl.
*G01R 31/389* (2019.01)
*G01R 31/392* (2019.01)
*G01R 31/396* (2019.01)
*H01M 10/48* (2006.01)
*H02J 7/00* (2006.01)

(52) U.S. Cl.
CPC ......... *G01R 31/392* (2019.01); *G01R 31/396* (2019.01); *H01M 10/482* (2013.01); *H02J 7/0014* (2013.01); *H02J 7/0049* (2020.01); *H02J 7/0069* (2020.01)

(58) Field of Classification Search
CPC .... G01R 31/382; H02J 7/0049; H02J 7/0069; H02J 7/0014
See application file for complete search history.

(56) References Cited

U.S. PATENT DOCUMENTS

| | | | |
|---|---|---|---|
| 2013/0041538 A1* | 2/2013 | Jin | G01R 31/382 324/427 |
| 2013/0234672 A1* | 9/2013 | Kubota | H02J 7/0016 320/134 |
| 2014/0361743 A1* | 12/2014 | Lin | H02J 7/0016 320/109 |

* cited by examiner

METHOD AND APPARATUS FOR QUANTITATIVE ANALYSIS OF BATTERY PERFORMANCE, AND ELECTRONIC DEVICE THEREWITH

CROSS-REFERENCE TO RELATED PATENT APPLICATION

This application claims priority to and the benefit of Chinese Patent Application No. 202111632188.8, filed Dec. 28, 2021, which is incorporated herein in its entirety by reference.

FIELD OF THE INVENTION

The present invention relates to the field of battery, and in particular, to method and apparatus for quantitative analysis of battery performance and an electronic device therewith.

BACKGROUND OF THE INVENTION

With the development of electric vehicles, the price of lithium batteries dropped sharply. The cost performance of lithium batteries leads to an irreversible trend to replace lead-acid batteries to be used for low-speed electric vehicles and as standby power supplies. However, the two types of lithium battery energy storage applications have a common disadvantage, that is, lack an effective operation and maintenance system for ensuring the safety during the whole life cycle and the service life, which results in uncertain investment incomes of lithium batteries.

SUMMARY OF THE INVENTION

In order to resolve the above problem, embodiments of the present invention provide a method and an apparatus for quantitative analysis of battery performance and an electronic device.

In a first aspect, an embodiment of the present invention provides a method for quantitative analysis of battery performance, including:

performing a full charging/discharging process on a to-be-analyzed battery cluster, and determining differential capacities versus voltage of a plurality of cells in the battery cluster at different times, where a constant current exists in at least part of a time period of the full charging/discharging process;

determining first times and first states of charge (SOC) when the differential capacities versus voltage of the cells reach a first peak and second times and second SOCs when the differential capacities versus voltage of the cells reach a second peak, and determining capacity parameters of the cells according to the first times, the first SOCs, the second times, and the second SOCs, where the second SOCs are greater than the first SOCs; and performing quantitative analysis on the battery cluster according to the capacity parameters of the plurality of cells.

In a second aspect, an embodiment of the present invention provides an apparatus for quantitative analysis of battery performance, including:

a charging/discharging module, configured to perform a full charging/discharging process on a to-be-analyzed battery cluster, and determine differential capacities versus voltage of a plurality of cells in the battery cluster at different times, where a constant current exists in at least part of a time period of the full charging/discharging process;

a processing module, configured to determine first times and first SOCs when the differential capacities versus voltage of the cells reach a first peak and second times and second SOCs when the differential capacities versus voltage of the cells reach a second peak, and determine capacity parameters of the cells according to the first times, the first SOCs, the second times, and the second SOCs, where the second SOCs are greater than the first SOCs; and an analysis module, configured to perform quantitative analysis on the battery cluster according to the capacity parameters of the plurality of cells.

In a third aspect, an embodiment of the present invention provides an electronic device, including a bus, a transceiver, a memory, a processor, and a computer program stored in the memory and runnable on the processor, where the transceiver, the memory, and the processor are connected through the bus, and when the computer program is executed by the processor, the steps in the method for quantitative analysis of battery performance according to any of the above descriptions are implemented.

In a fourth aspect, an embodiment of the present invention further provides a computer-readable storage medium storing a computer program, where when the computer program is executed by a processor, the steps in the method for quantitative analysis of battery performance according to any of the above descriptions are implemented.

In the solution provided in the first aspect of the embodiments of the present invention, based on the fact that the SOCs when the differential capacities versus voltage reach peaks are relatively fixed, the capacity parameters of the cells in the battery cluster can be accurately determined by using the times and the SOCs in the charging/discharging process, which realizes quantitation of the capacity of the each cell, thereby realizing the quantitative analysis of the battery cluster. In the method, the battery cluster does not need to be disassembled, which avoids a waste of resources. In addition, the capacity parameters can be quickly and accurately determined through a full charging/discharging process. The method requires only a small calculation amount, can be easily implemented, and can realize relatively accurate quantitative analysis for the battery cluster. Moreover, various capacity parameters can be determined by using the full charging/discharging process, which facilitates quantitative analysis of the operation and maintenance effects during subsequent operation and maintenance of the battery cluster such as equalization.

In order to achieve the above objectives, features and advantages of the present invention more comprehensible, preferred embodiments are listed for detailed description below with reference to the accompanying drawings.

BRIEF DESCRIPTION OF THE DRAWINGS

To describe the technical solutions in embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DETAILED DESCRIPTION OF THE INVENTION

Figure 1:
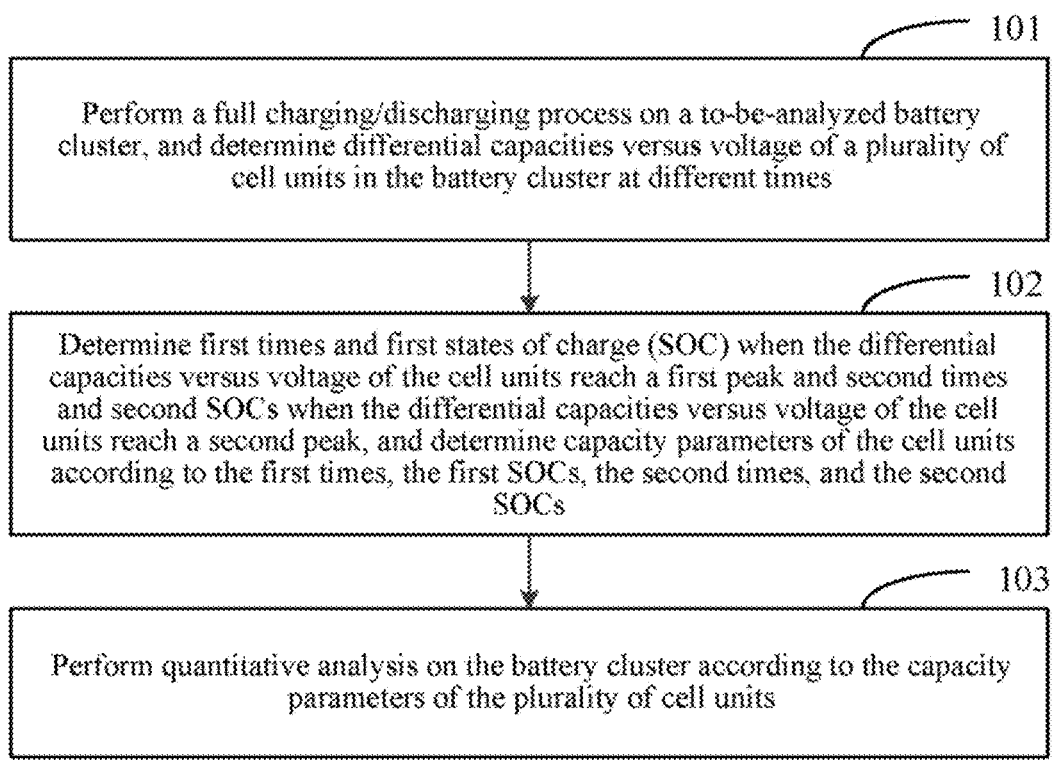
FIG. 1 a flowchart of a method for quantitative analysis of battery performance according to an embodiment of the present invention.

In the description of the present invention, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present invention and simplifying the description, but are not used to indicate or imply that the indicated apparatus or element needs to have a particular direction or be constructed and operated in a particular direction, and therefore. Therefore, such terms should not be construed as limiting of the present invention.

In addition, the terms "first" and "second" are used merely for the purpose of description, and shall not be construed as indicating or implying relative importance or implying a quantity of indicated technical features. Therefore, features defined by "first" and "second" may explicitly or implicitly include one or more such features. In the descriptions of the present invention, unless otherwise explicitly specified, "a plurality of" means two or more than two.

In the present invention, unless otherwise clearly specified and defined, terms such as "installation", "interconnection", "connection", and "fixing" shall be understood in a broad sense. For example, the connection may be a fixed connection, a detachable connection, or an integral connection; or the connection may be a mechanical connection or an electrical connection; or the connection may be a direct connection, an indirect connection through an intermediate medium, or internal communication between two elements. A person of ordinary skill in the art can understand specific meanings of the foregoing terms in the present invention according to a specific situation.

Generally, retired energy storage batteries can no longer be used for electric devices such as electric vehicles. Directly disassembling the useless energy storage batteries can avoid rapid reduction of a module life caused by performance differences of cells in a battery module. Nevertheless, a great waste of resources is caused. Since remaining capacities of most energy storage batteries are 60%-70% of initial capacities, the energy storage batteries may be evaluated and maintained through quantitative analysis of specific battery parameters for cascade utilization. Evaluating and maintaining the energy storage batteries are urgent problems to be resolved for cascade utilization.

Currently, quantitative analysis is mainly performed based on the performance parameters of energy storage batteries during the evaluation of the energy storage batteries. Current solutions allow only rough estimation of a battery capacity. For example, a charge or discharge capacity required for a single module is calculated by using a correspondence between a voltage and a capacity of a ternary system lithium ion battery through a charging/discharging ending voltage of the ternary system lithium ion battery, so as to evaluate and equalize the ternary system lithium ion battery. The current solutions cannot realize desirable evaluation, and cannot help evaluate improvements of the battery capacity after the equalization, which fails in the quantitative analysis of the equalization effect.

An embodiment of the present invention provides a method for quantitative analysis of battery performance, which accurately determines a capacity of a battery cluster by using a time and a state of charge (SOC) in a charging/discharging process, thereby realizing the quantitative analysis of the battery cluster. Referring to FIG. 1, the method includes the following steps:

Step 101: Perform a full charging/discharging process on a to-be-analyzed battery cluster, and determine differential capacities versus voltage of a plurality of cells in the battery cluster at different times, where a constant current exists in at least part of a time period of the full charging/discharging process.

In one embodiment of the present invention, the battery cluster is a set of a plurality of cells. The battery cluster includes a plurality of cells, and the cells are connected in series. The cells in the battery cluster may be grouped into multiple battery modules, and each battery module includes multiple cells. In one embodiment, during analysis of the battery cluster, one or more consecutive cells in the battery cluster are considered as a cell unit for analysis. The performance of the whole battery cluster is determined by analyzing the performance of the cell unit. For example, a cell may be considered as a cell unit, or a battery module may be considered as a cell unit, which depends on an actual situation. Generally, one cell corresponds to one cell unit.

In one embodiment, when the performance of the battery cluster needs to be analyzed, a full charging/discharging process is performed on the battery cluster. The full charging/discharging process includes a full charging process and/or a full discharging process, that is, the battery cluster may be fully charged and fully discharged. Full charging means charging the battery cluster to a fully charged state from a fully discharged state, and full discharging means discharging the battery cluster to the fully discharged state from the fully charged state. In addition, a constant current exists in at least part of the full charging/discharging process, that is, constant current charging or constant current discharging is performed for at least part of the full charging/discharging process. For example, the constant current exists in the whole full charging/discharging process. For example, the full charging process begins when the battery cluster reaches a discharging ending voltage and ends when the battery cluster reaches a charging ending voltage, and the full discharging process begins when the battery cluster reaches the charging ending voltage and ends when the battery cluster reaches the discharging ending voltage. More capacity parameters may be subsequently obtained based on the full charging process or the full discharging process.

In a case that the full charging/discharging process is performed on the battery cluster, charging/discharging data such as a voltage and a current of each cell in the battery cluster may be acquired in real time through an existing detection device, so that differential capacities versus voltage of the plurality of cells in the battery cluster at different times can be determined. That is to say, a relationship between the differential capacity versus voltage of the cell and the time can be determined. For a lithium iron phosphate battery, a differential capacity versus voltage of an $i^{th}$ cell is $dQ_i/dV$. For a ternary battery, a differential capacity versus voltage of an $i^{th}$ cell is $d^2Q_i/dV^2$.

Step 102: Determine first times and first SOCs when the differential capacities versus voltage of the cells reach a first peak and second times and second SOCs when the differential capacities versus voltage of the cells reach a second peak, and determine capacity parameters of the cells according to the first times, the first SOCs, the second times, and the second SOCs, where the second SOCs are greater than the first SOCs.

Figure 2:
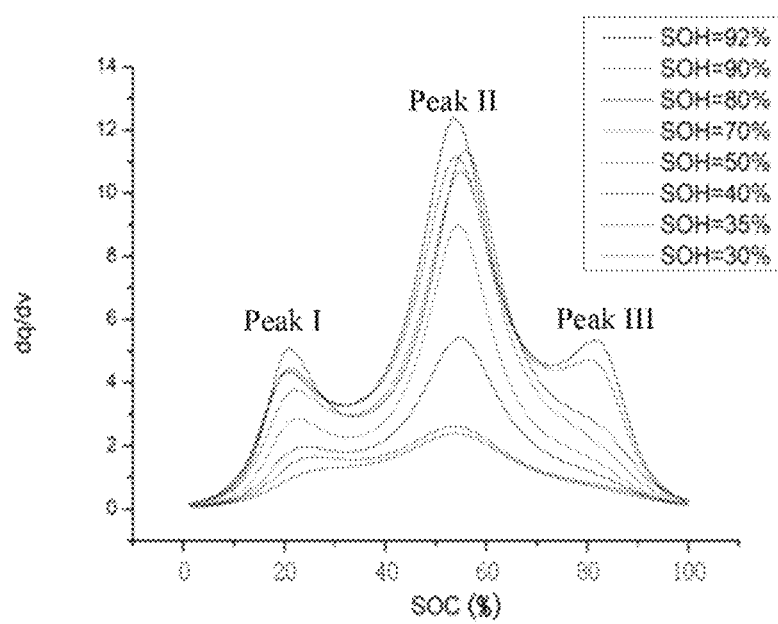
FIG. 2 shows a relationship between a differential capacity versus voltage and a state of charge (SOC) at different states of health (SOH).

In one embodiment of the present invention, a capacity parameter of a corresponding cell may be determined based on the fact that differential capacities versus voltage of cells with different states of health (SOH) reach peaks consistently. Specifically, for relationships between differential capacities versus voltage and SOCs of the cells in the same battery cluster in different SOHs, reference may be made to FIG. 2. In FIG. 2, the differential capacity versus voltage is represented by dq/dv. It may be learned from FIG. 2 that as the SOH of the cell decreases gradually, SOC values corresponding to a peak I and a peak II almost remain unchanged. Therefore, the SOC may be considered as a fixed value. Therefore, the SOC values corresponding to the differential capacities versus voltage at the peak I and the peak II may be pre-determined.

For the to-be-analyzed battery cluster, the first times and the first SOCs when the differential capacities versus voltage of the cells therein reach the first peak and the second times and the second SOCs when the differential capacities versus voltage of the cells reach the second peak may be determined. The first peak and the second peak are peaks where the differential capacity versus voltage has a fixed SOC at different SOHs. The first peak may be a first one of peaks the differential capacity versus voltage reaches as the SOC increases, such as a peak I in FIG. 2. The second peak may be a peak where the differential capacity versus voltage reaches a maximum value, such as a peak II in FIG. 2.

In the full charging/discharging process, if I represents a current, a battery level of the cell is $Q=\int I dt$. Since the full charging/discharging process is a constant current charging/discharging process, the SOC changes linearly with time. Therefore, a relationship between the differential capacity versus voltage and the SOC and a relationship between the differential capacity versus voltage and time are similar. Thus, when the differential capacity versus voltage reaches a corresponding peak with time, the SOC reaches the corresponding peak. A time when the differential capacity versus voltage reaches the first peak, that is, the first time, may be determined by using the differential capacities versus voltage of the cell at different times, and the SOC of the cell at this time, that is, the first SOC may be determined.

Likewise, a time when the differential capacity versus voltage reaches the second peak, that is, the second time, may be determined, and the SOC of the cell at this time, that is, the second SOC may be determined. Since the first SOC and the second SOC are fixed values, the first SOC and the second SOC may be pre-determined. In order to help distinguish between the first peak and the second peak, in one embodiment, a peak with a larger SOC is referred to as the second peak, that is, the second SOC is greater than the first SOC.

After the parameters such as the first time, the first SOC, the second time, and the second SOC are determined, the capacity parameter of the cell may be determined based on the parameters. The capacity parameter is related to a capacity of the cell, which may represent a capacity of the cell in a certain state.

For example, a $k^{th}$ to-be-analyzed cell in the battery cluster is referred to as a "core unit k", where k=1, 2, . . . , and n, and n represents a number of cells. If the first SOC of the cell k when reaching the first peak is $SOC_{k,I\ peak}$, and the second SOC of the cell k when reaching the second peak is $SOC_{k,II\ peak}$, a difference $\Delta SOC_k$ between the SOCs of the cell k when reaching the first peak and the second peak may be determined, where $\Delta SOC_k = SOC_{k,II\ peak} - SOC_{k,I\ peak}$. Since the first SOC and the second SOC are usually fixed values, the difference between the first SOC and the second SOC may be pre-determined, that is, $\Delta SOC_k$ is pre-determined, and different k values correspond to the same SOC difference $\Delta SOC_k$.

Moreover, a difference $\Delta Q_k$ between capacities of the cell k when reaching the first peak and the second peak may be determined, and then a maximum capacity $Q_{kmax}$ of the cell k may be determined, where the maximum capacity $Q_{kmax} = 100\% \times \Delta Q_k / \Delta SOC_k$. The capacity difference is $\Delta Q_k = Q_{k2} - Q_{k1}$. $Q_{k2}$ represents the capacity of the cell k when reaching the second peak, such as a capacity of the cell when reaching the peak II, and $Q_{k1}$ represents a capacity of the cell k when reaching the first peak, such as a capacity of the cell when reaching the peak I. Specifically, the capacity difference $\Delta Q_k$ may be determined based on the first time $t_{k,I\ peak}$ and the second time $t_{k,II\ peak}$ of the cell k and the current value I in the full charging/discharging process. For example, determining the difference $\Delta Q_k$ between the capacities of the cell k when reaching the first peak and the second peak includes: determining the capacity difference $\Delta Q_k$ between the first peak and the second peak according to the first time $t_{k,I\ peak}$ when the cell k reaches the first peak and the second time $t_{k,II\ peak}$ when the cell reaches the second peak, where $\Delta Q_k = \int_{t_{k,I\ peak}}^{t_{k,II\ peak}} I\ dt$, and I represents the current value in the full charging/discharging process.

It should be noted that in order to accurately locate the first peak and the second peak, a constant current needs to exist from a relatively small SOC to the second peak (that is, the second SOC). For example, if the full charging/discharging process includes a full charging process, the constant current may exist in a time period from a charging beginning time to a time when all of the cells reach the second peak (for example, a largest one of the second times). If the full charging/discharging process includes a full discharging process, the constant current may exist in a time period from the earliest time of the plurality of cells when the second peak is reached (for example, a smallest one of the second values) to a discharging ending time.

Step 103: Perform quantitative analysis on the battery cluster according to the capacity parameters of the plurality of cells.

In one embodiment of the present invention, after the capacity parameters of the plurality of cells are determined, quantitative analysis of performance of the battery cluster may be performed based on the capacity parameters. The performance of the battery cluster can be accurately analyzed. For example, after maximum capacities of the plurality of cells are determined, a current cell with an abnormal maximum capacity may be determined based on differences between the maximum capacities of the cells, to prompt battery operation and maintenance personnel to treat the abnormal cell.

According to the method for quantitative analysis of battery performance provided in one embodiment of the present invention, based on the fact that the SOCs when the differential capacities versus voltage reach peaks are relatively fixed, the capacity parameters of the cells in the battery cluster can be accurately determined by using the times and the SOCs in the charging/discharging process, which realizes quantitation of the capacity of the each cell, thereby realizing the quantitative analysis of the battery cluster. In the method, the battery cluster does not need to be disassembled, which avoids a waste of resources. In addition, the capacity parameters can be quickly and accurately determined through a full charging/discharging process. The method requires only a small calculation amount, can be easily implemented, and can realize relatively accurate quantitative analysis for the battery cluster. Moreover, various capacity parameters can be determined by using the full charging/discharging process, which facilitates quantitative analysis of the operation and maintenance effects during subsequent operation and maintenance of the battery cluster such as equalization.

Figure 3:
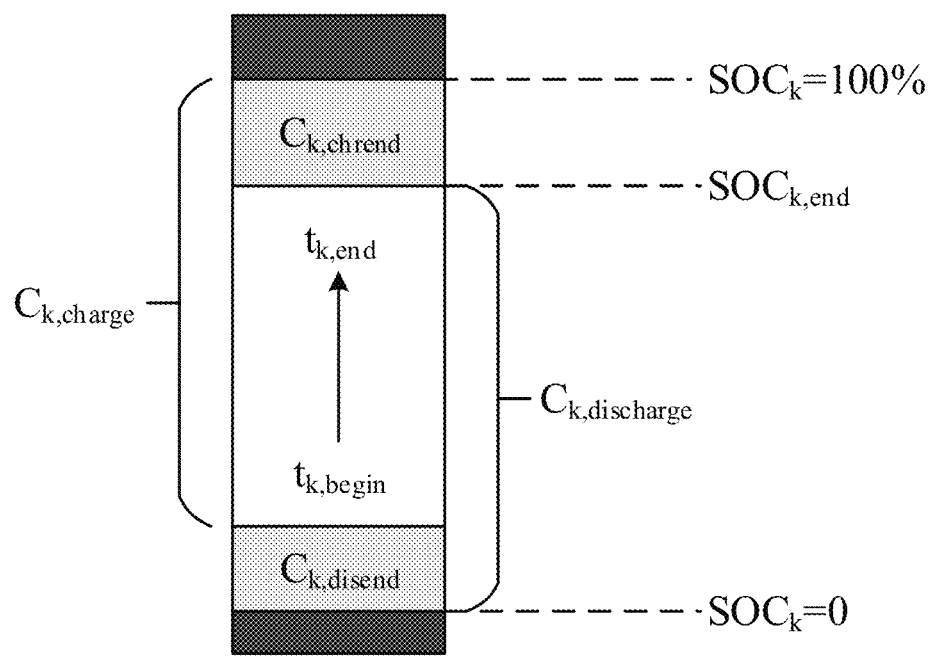
FIG. 3 is a schematic capacity distribution diagram of a cell according to an embodiment of the present invention.

After a plurality of charging/discharging cycles, the cells in the battery cluster have inconsistent capacities. A capacity distribution of one cell may be shown in FIG. 3. FIG. 3 shows a capacity distribution of the cell k. Since irreversible charging/discharging areas exist in the cell, in order to avoid irreversible reduction of a cell life caused by charging or discharging in the irreversible charging/discharging areas, an ending voltage (including a charging ending voltage and a discharging ending voltage) is usually used for the battery cluster for charging/discharging management. Dark areas at upper and lower ends in FIG. 3 represent the irreversible charging/discharging areas. Other areas are all reversible charging/discharging areas. The reversible charging/discharging area of the cell k corresponds to areas in FIG. 3 having an $SOC_k$ from 0 to 100%.

When the battery cluster is fully charged, that is, when the battery cluster reaches the charging ending voltage, the cell therein is also fully charged, that is, the SOC reaches 100%. For example, the SOC of the cell k is $SOC_k=100\%$. However, due to a charging protection mechanism of the battery cluster, only a few cells are fully charged or even one cell is fully charged at this time, and the capacities of the other cells are not full. Likewise, when the battery cluster is fully discharged, that is, when the battery cluster reaches the discharging ending voltage, the cell therein is also fully discharged, that is, the SOC is 0. For example, the SOC of the cell k is $SOC_k=0$. However, due to a discharging protection mechanism of the battery cluster, only a few cells are fully discharged or even one cell is fully discharged at this time, and the capacities of the other cells are not zero. In practice, "fully charged" and "fully discharged" are expressed with respect to the battery cluster. Due to the inconsistency of the cells, it cannot be ensured that all of the cells are fully charged or fully discharged.

If a beginning time of the full charging/discharging process of the battery cluster is t and an ending time is $t_{k,end}$, beginning time of the full charging/discharging process of each of the cells in the battery cluster is $t_{k,begin}$, and an ending time is $t_{k,end}$. In FIG. 3, the full charging process of the battery cluster is exemplified, that is, the battery cluster is charged to the charging ending voltage from the discharging ending voltage. As shown in FIG. 3, $t_{k,begin}$ represents a beginning time of the full charging process, and $t_{k,end}$ represents an ending time of the full charging process. As shown in FIG. 3, when the battery cluster is fully charged and reaches the charging ending voltage, that is, at $t_{k,end}$, a battery level of the cell k is expressed as $C_{k,discharge}$. A value of the battery level $C_{k,discharge}$ may represent a capacity by which the cell k may be discharged after the battery cluster is fully charged, which is referred to as a "discharge capacity" in one embodiment, which is referred to as a "discharge capacity" in one embodiment. Due to the inconsistency of the cells, the SOC of the cell k at a charging ending moment (that is, $t_{k,end}$) of the battery cluster is not necessarily 100%. In one embodiment, the SOC of the cell k at the charging ending moment of the battery cluster is referred to as a "charging ending SOC", which is represented by $SOC_{k,end}$. In addition, at the charging ending moment of the battery cluster, the cell k may not be fully charged and may be further charged by a battery level, that is, the cell k has "a capacity for further charging at the charging ending moment". In one embodiment, $C_{k,chrend}$ represents the capacity by which the cell k may be further charged when the charging ending moment of the battery cluster is reached.

Similarly, when the battery cluster is fully discharged and reaches the discharging ending voltage, that is, at $t_{k,begin}$, the cell k is not fully discharged and has a remaining battery level, that is, $C_{k,disend}$. The battery level may represent a capacity by which the cell k may be further discharged when the discharging ending moment of the battery cluster is reached. Moreover, if the inconsistency between the cells is not considered from the beginning time $t_{k,begin}$ of the full charging process of the battery cluster, the cell k is supposed to be fully charged, and the SOC thereof can reach 100%. In one embodiment, a capacity of the cell k from the discharging ending voltage of the battery cluster to full charge is represented by a battery level by which the cell k may be charged, and is referred to as a "charge capacity", which is represented by $C_{k,charge}$.

FIG. 3 illustrates some capacity parameters of a cell. For example, the cell k includes the following capacity parameters: the capacity $C_{k,chrend}$ by which the cell k is to be further charged when the charging ending moment of the battery cluster is reached, the capacity $C_{k,disend}$ by which the cell k is to be further discharged when the discharging ending moment of the battery cluster is reached, the charge capacity $C_{k,charge}$ of the cell k, and the discharge capacity $C_{k,discharge}$ of the cell k. Moreover, as shown in FIG. 3, the maximum capacity $Q_{kmax}$ of the cell k is a sum of the charge capacity $C_{k,charge}$ of the cell k and the capacity $C_{k,disend}$ for further discharging at the discharging ending moment or a sum of the discharge capacity $C_{k,discharge}$ of the cell k and the capacity $C_{k,chrend}$ for further discharging at the charging ending moment. That is to say, $Q_{kmax}=C_{k,charge}+C_{k,disend}=C_{k,discharge}+C_{k,chrend}$.

In one embodiment of the present invention, the charging ending $SOC_{k,end}$ of the cell k may be determined based on the time and the SOC of the cell k in full charging/discharging process, and then various capacity parameters of the cell k may be determined. Specifically, in addition to determining the maximum capacity $Q_{kmax}$ of the cell k, "determining the capacity parameters of the cells according to the first times, the first SOCs, the second times, and the second SOCs" in step 102 may further include the following steps:

Step A1: Determine a charging ending $SOC_{k,end}$ of the cell k at the charging ending moment of the battery cluster according to a target time and a target SOC when the cell k reaches a target peak and the maximum capacity $Q_{kmax}$ of the cell k, where the target peak is the first peak or the second peak, and the target time is the corresponding first time or second time.

When the battery cluster reaches the charging ending voltage or the discharging ending voltage, due to the inconsistent states of the different cells in the battery cluster, the state of the each cell cannot be directly determined. In one embodiment of the present invention, based on the fact that the SOC at the first peak or the second peak can be obtained, the first peak or the second peak is used as the target peak, and an SOC between the target peak and the charging ending moment of the battery cluster may be determined based on the charging/discharging data in the full charging/discharging process and the maximum capacity $Q_{kmax}$, and the charging ending $SOC_{k,end}$ of the cell k may be determined.

Optionally, when the full charging/discharging process includes the full charging process, the charging ending moment of the battery cluster corresponds to a charging ending time $t_{k,chrend}$ of the full charging process, which is a charging ending time of the cell k. If a current value of the full charging process is I, a battery level from the target time $t_{k,T\,peak}$ of the target peak to the charging ending moment of the battery cluster is $\int_{t_{k,T\,peak}}^{t_{k,chrend}} I\,dt$. An SOC corresponding to the battery level is $\int_{t_{k,T\,peak}}^{t_{k,chrend}} I\,dt/Q_{kmax}$. Therefore, the charging ending $SOC_{k,end}$ of the cell k satisfies:

$$SOC_{k,end}=SOC_{k,T\,peak}+\int_{t_{k,T\,peak}}^{t_{k,chrend}} I\,dt/Q_{kmax}.$$

For example, the target peak is the second peak, that is, the target SOC is $SOC_{k,II\,peak}$, and the target time is $t_{k,II\,peak}$. In this case, the charging ending $SOC_{k,end}$ of the cell k satisfies:

$$SOC_{k,end}=SOC_{k,II\,peak}+\int_{t_{k,II\,peak}}^{t_{k,chrend}} I\,dt/Q_{kmax}.$$

Similarly, when the full charging/discharging process includes the full discharging process, the discharging ending moment of the battery cluster corresponds to a discharging beginning time $t_{k,disbegin}$ of the full discharging process. If a current value of the full discharging process is I, a battery level between the target time $t_{k,T\,peak}$ of the target peak and the discharging beginning moment of the battery cluster is $\int_{t_{k,T\,peak}}^{t_{k,chrend}} I\,dt$. An SOC corresponding to the battery level is $\int_{t_{k,T\,peak}}^{t_{k,chrend}} I\,dt/Q_{kmax}$. Therefore, the charging ending $SOC_{k,end}$ of the cell k satisfies:

$$SOC_{k,end}=SOC_{k,T\,peak}+\int_{t_{k,disbegin}}^{t_{k,T\,peak}} I\,dt/Q_{kmax}.$$

where $SOC_{k,T\,peak}$ represents an SOC of the target peak, $t_{k,T\,peak}$ represents the target time of the target peak, and $t_{k,disbegin}$ represents a discharging beginning time of the cell k.

Step A2: Determine, based on the charging ending $SOC_{k,end}$ of the cell k, the capacity $C_{k,chrend}$ by which the cell k is to be further charged when the charging ending moment of the battery cluster is reached and the capacity $C_{k,disend}$ by which the cell k is to be further discharged when the discharging ending moment of the battery cluster is reached, where the capacity $C_{k,chrend}$ by which the cell is to be further charged at the charging ending moment and the capacity $C_{k,disend}$ by which the cell is to be further discharged at the discharging ending moment satisfy:

$$C_{k,chrend}=(1-SOC_{k,end})\times Q_{kmax};$$

$$C_{k,disend}=SOC_{k,end}\times Q_{kmax}-\int_{t_{k,begin}}^{t_{k,end}} I\,dt.$$

where $t_{k,begin}$ represents a beginning time of the full charging/discharging process of the cell k, $t_{k,end}$ an ending time of the full charging/discharging process of the cell k, and I represents a current value during the full charging/discharging process.

In one embodiment of the present invention, after the charging ending $SOC_{k,end}$ is determined, the corresponding capacity parameter may be determined by using a relationship between the capacity parameter and $SOC_{k,end}$ and the maximum capacity $Q_{kmax}$. Specifically, based on FIG. 3, it may be learned that the maximum capacity $Q_{kmax}$ of the cell k corresponds to the SOC of 100%, an SOC corresponding to the capacity $C_{k,chrend}$ for further charging when the charging ending moment of the battery cluster is reached is $1-SOC_{k,end}$, and the capacity $C_{k,chrend}$ satisfies: $C_{k,chrend}=(1-SOC_{k,end})\times Q_{kmax}$.

In the full charging/discharging process, if the beginning time is $t_{k,begin}$, and the ending time is $t_{k,end}$, a battery level (a charging battery level or a discharging battery level) $t_{k,end}$, corresponding to the whole full charging/discharging process is $\int_{t_{k,begin}}^{t_{k,end}} I\,dt$, a sum of which and the capacity $C_{k,disend}$ for further discharging at the discharging ending moment is the discharge capacity $C_{k,discharge}$, which corresponds to the charging ending $SOC_{k,end}$. Therefore, the capacity $C_{k,disend}$ satisfies:

$$C_{k,disend}=SOC_{k,end}\times Q_{kmax}-\int_{t_{k,begin}}^{t_{k,end}} I\,dt.$$

Similarly, if the capacity parameter includes the charge capacity and the discharge capacity, after the charging ending SOC is determined in step A1, step 102 of "determining the capacity parameters of the cells according to the first times, the first SOCs, the second times, and the second SOCs" may further include the following step:

Step A3: Determine a charge capacity $C_{k,charge}$ of the cell k and a discharge capacity $C_{k,discharge}$ of the cell k, where the charge capacity $C_{k,charge}$ and the discharge capacity $C_{k,discharge}$ satisfy:

$$C_{k,charge}=\int_{t_{k,begin}}^{t_{k,end}} I\,dt+(1-SOC_{k,end})\times Q_{kmax};$$

$$C_{k,discharge}=SOC_{k,end}\times Q_{kmax}.$$

In one embodiment of the present invention, as shown in FIG. 3, since the discharge capacity $C_{k,discharge}$ of the cell k corresponds to the charging ending $SOC_{k,end}$, the discharge capacity $C_{k,discharge}$ satisfies: $C_{k,discharge}=SOC_{k,end}\times Q_{kmax}$. Correspondingly, the charge capacity $C_{k,charge}$ includes the battery level corresponding to the full charging/discharging process and the capacity $C_{k,chrend}$ for further charging at the charging ending moment. Therefore, the charge capacity $C_{k,charge}$ satisfies:

$$C_{k,charge}=\int_{t_{k,begin}}^{t_{k,end}} I\,dt+C_{k,chrend}.$$

that is, $$C_{k,charge}=\int_{t_{k,begin}}^{t_{k,end}} I\,dt+(1-SOC_{k,end})\times Q_{kmax}.$$

It should be noted that, since the maximum capacity $Q_{kmax}$ may be divided into a plurality of parts, the capacity parameters determined in one embodiment may be expressed in a variety of forms. Since different forms are equivalent, this embodiment merely describes and defines a required logical relationship between the capacity parameters, and does not mean that the above formulas need to be used to calculate the corresponding capacity parameters in actual application. For example, since the discharge capacity $C_{k,discharge}$ satisfies: $C_{k,discharge}=SOC_{k,end}\times Q_{kmax}$, $C_{k,discharge}$ may be directly determined by using the formula after $Q_{kmax}$ and $SOC_{k,end}$ of the cell k are determined. Alternatively, as shown in FIG. 3, since $C_{k,discharge}=C_{k,disend}+\int_{t_{k,begin}}^{t_{k,end}} I\, dt$, $C_{k,discharge}$ may be calculated after $C_{k,disend}$ is determined. Although the actual processes of calculating $C_{k,discharge}$ are different, the processes are essentially the same. The calculated discharge capacities $C_{k,discharge}$ both satisfy $C_{k,discharge}=SOC_{k,end}\times Q_{kmax}$.

According to the method for quantitative analysis of battery performance provided in one embodiment of the present invention, the charging ending SOC of the each cell can be relatively accurately determined, and the capacity parameters such as the charge capacity of the cell, the discharge capacity, the capacity for further charging at the charging ending moment, and the capacity for further discharging at the discharging ending moment can be further accurately obtained based on the charging/discharging data of the cell in the full charging/discharging process and the maximum capacity of the cell. Based on the capacity parameters, more accurate quantitative analysis of the battery performance of the battery cluster can be realized, which facilitates quantitative evaluation of effects of operation and maintenance such as equalization and replacement of the battery cluster.

Optionally, when a cell in the battery cluster is abnormal, the cell may be operated and maintained, such as replacing the cell, or charging or discharging the cell to realize equalization, thereby improving the overall charging/discharging performance of the battery cluster. In one embodiment of the present invention, quantitative analysis of the operation and maintenance effects of the battery cluster can be realized based on the above capacity parameters. Step 103 of "performing quantitative analysis on the battery cluster according to the capacity parameters of the plurality of cells" may include the following steps:

Step B1: Determine, according to a capacity by which each of the cells is to be further charged at a charging ending moment of the each cell, the earliest fully charged cell j in the battery cluster and the earliest fully charged cell j' other than the cell j.

Step B2: If the cell j is replaced, an effective charge capacity of the battery cluster is increased by $C_{j',chrend}$.

Step B3: If the cell j is discharged alone to an ending voltage after discharging of the battery cluster ends, the effective charge capacity of the battery cluster is increased by $\min[C_{j',chrend}, C_{j,disend}]$.

Alternatively, step 103 of "performing quantitative analysis on the battery cluster according to the capacity parameters of the plurality of cells" may include the following steps:

Step C1: Determine, according to a capacity by which each of the cells is to be further discharged at a discharging ending moment of the each cell, the earliest fully discharged cell i in the battery cluster and the earliest fully discharged cell i' other than the cell i.

Step C2: If the cell i is replaced, an effective discharge capacity of the battery cluster is increased by $C_{i',disend}$.

Step C3: If the cell j is charged alone to an ending voltage after charging of the battery cluster ends, the effective discharge capacity of the battery cluster is increased by $\min[C_{i',disend}, C_{i,chrend}]$.

The main inconsistency between the different cells in the battery cluster lies in the different charge capacities and different discharge capacities of the different cells or the different capacities for further charging when the charging ending moment of the battery cluster is reached and the different capacities for further discharging when the discharging ending moment of the battery cluster is reached. That is to say, $C_{k,charge}$, $C_{k,discharge}$, $C_{k,chrend}$, and $C_{k,disend}$ may vary for a different cell k. In one embodiment of the present invention, after a full charging process or a full discharging process is performed on the battery cluster, the capacity parameters of the plurality of cells may be determined, and the capacity parameter of the each cell may be used to determine which cell is the earliest fully charged during the charging of the battery cluster and which cell is the earliest fully discharged during the discharging of the battery cluster.

Figure 4:
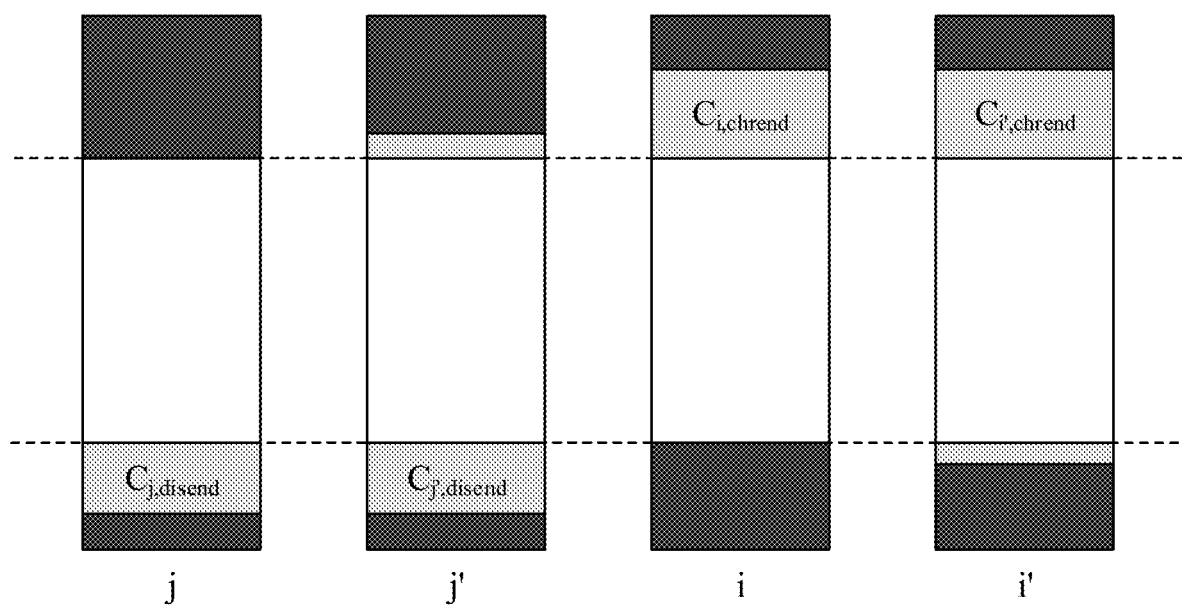
FIG. 4 is a schematic capacity distribution diagram of some cells in a battery cluster according to an embodiment of the present invention.

A smaller capacity by which the cell may be further charged when the charging ending moment of the battery cluster is reached means an earlier time the cell may be fully charged, that is, the cell with the minimum capacity $C_{k,chrend}$ is the earliest fully charged. For example, if the capacity $C_{j,chrend}$ by which the cell j may be further charged when the charging ending moment of the battery cluster is reached is the smallest, the cell j in the battery cluster is the earliest fully charged. Similarly, a smaller capacity by which the cell may be further discharged when the discharging ending moment of the battery cluster is reached means an earlier time the cell may be fully discharged, that is, the cell with the minimum capacity $C_{k,disend}$ is the earliest fully discharged. For example, if the capacity $C_{i,disend}$ by which the cell i may be further discharged when the discharging ending moment of the battery cluster is reached is the smallest, the cell i in the battery cluster is the earliest fully discharged. In general, if the cell j is the earliest fully charged, $C_{i,chrend}=0$. If the cell i is the earliest fully discharged, $C_{i,disend}=0$. Based on the same principle, a second earliest fully charged cell, that is, the earliest fully charged cell j' other than the cell j, may be determined, and $C_{j',chrend}$ is the second smallest. A second earliest fully discharged cell, that is, the earliest fully discharged cell j' other than the cell j, may be determined, and $C_{j',chrend}$ is the second smallest. A capacity diagram of the cells j, j', i, and i' may be shown in FIG. 4. It may be understood by those skilled in the art that, since the currents I of the different cells in the full charging/discharging process of the battery cluster are the same, and the beginning times $t_{k,begin}$ and the ending times $t_{k,end}$ of the full charging/discharging processes of the different cells are the same, the capacities $\int_{t_{k,begin}}^{t_{k,end}} I\, dt$ of the different cells are the same. However, different from the capacities of the whole cells, the battery levels of the different cells may be different at the beginning time or the ending time. In FIG. 4, the capacities $\int_{t_{k,begin}}^{t_{k,end}} I\, dt$ of the different cells are aligned with each other merely for facilitating comparison.

Figure 5:
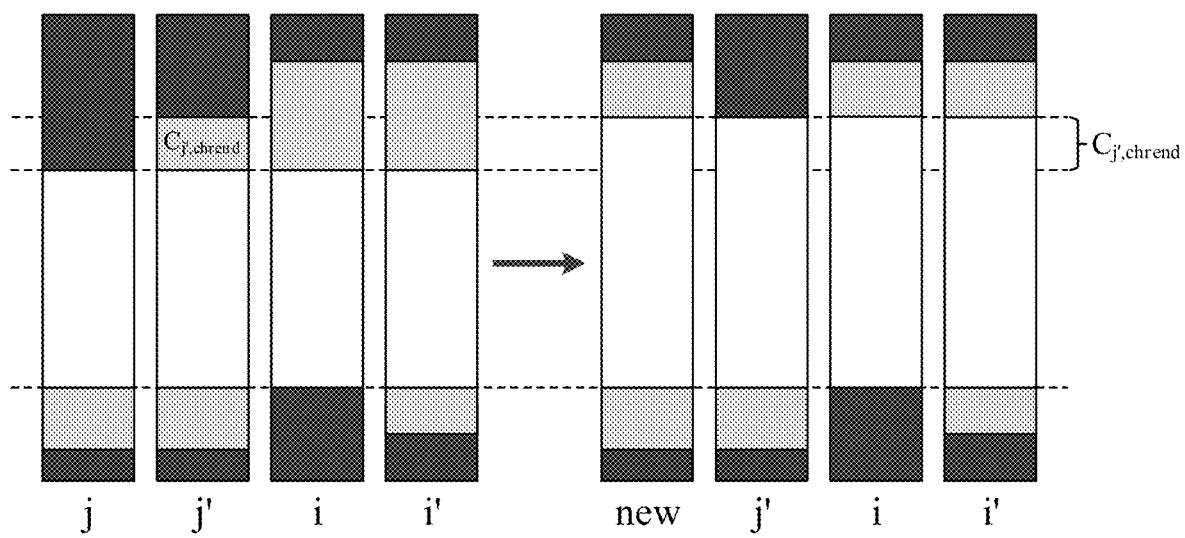
FIG. 5 is a schematic diagram of a capacity improvement through replacement of a cell according to an embodiment of the present invention.

If the cell j is the earliest fully charged, the cell may be normal or abnormal. If the cell j is abnormal, and the cell j is replaced, that is, the cell j is replaced with a new healthy cell, the cell j' in the battery cluster after the replacement is the earliest fully charged. During charging of the battery cluster after the replacement, the cell j' can be fully charged, that is, at this time, the capacity by which the cell j' may be further charged when the charging ending moment of the battery cluster is reached is zero. In other words, the battery cluster after the replacement may be charged by an additional battery level of $C_{j',chrend}$ compared with the previous battery cluster, that is, the effective charge capacity of the battery cluster can be increased by $C_{j',chrend}$. The improvement of the effective charge capacity of the battery cluster after the cell j is replaced with the new cell may be shown in FIG. 5.

Figure 6:
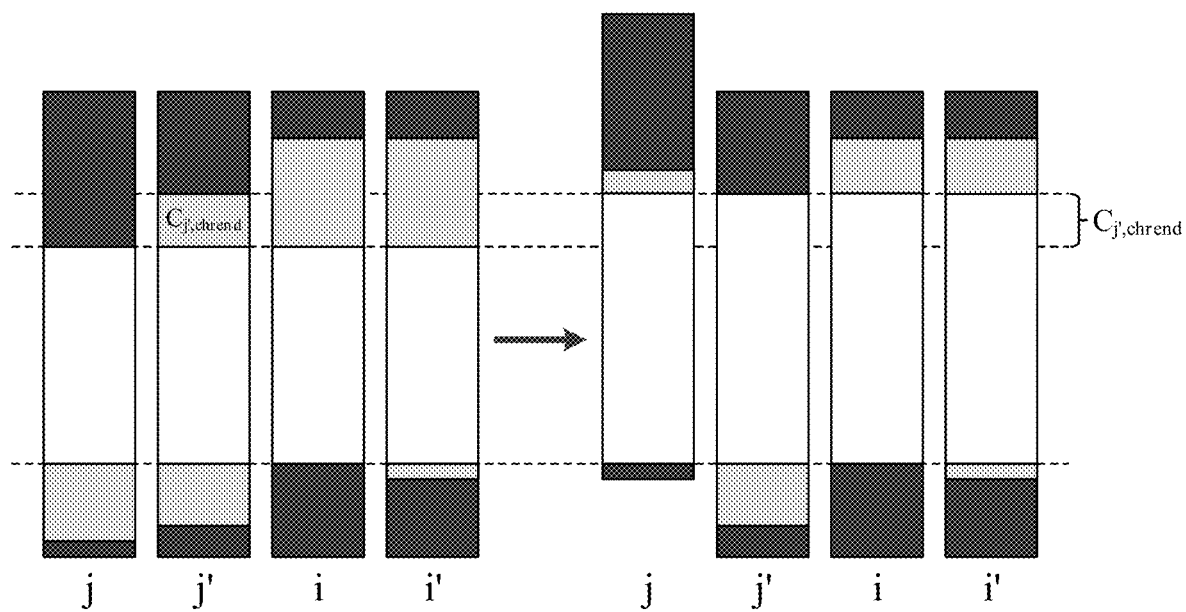
FIG. 6 is a schematic diagram of a capacity improvement through discharge of a cell alone according to an embodiment of the present invention.
Figure 7:
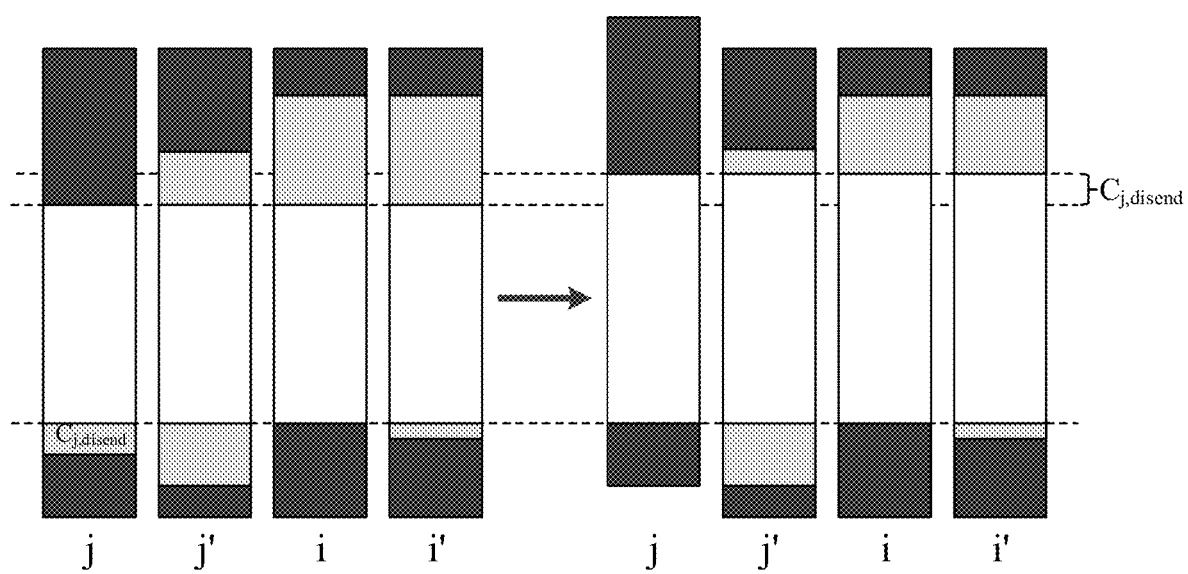
FIG. 7 is another schematic diagram of a capacity improvement through discharge of a cell alone according to an embodiment of the present invention.

Alternatively, when the cell j is still available, for example, when the health of the cell j still satisfies the use requirements, the cell j may not be replaced. At this time, the cell j may be discharged to reduce the inconsistency between the cells in the battery cluster, thereby realizing equalization. Specifically, the cell j may be discharged alone. For example, the battery cluster may be discharged to the discharging ending voltage of the battery cluster. At this time, the discharge of the battery cluster ends. Then the cell j is discharged alone to an ending voltage of the cell j, so that an SOC of the cell j is $SOC_j=0$. During subsequent charging of the battery cluster, the cell j may be charged starting from the SOC of zero until the battery cluster is fully charged. In this case, the full charge of the battery cluster depends on whether the capacity $C_{j,disend}$ by which the cell j may be further discharged when the discharging ending moment of the battery cluster is reached or the capacity $C_{j',chrend}$ by which the cell j' may be further charged when the charging ending moment of the battery cluster is reached is larger or smaller before the cell j is discharged alone. Referring to FIG. 6, if $C_{j,disend}$ is greater than $C_{j',chrend}$, the cell j' is fully charged earlier, and therefore the effective charge capacity of the battery cluster is increased by $C_{j',chrend}$. Alternatively, referring to FIG. 7, if $C_{j,disend}$ is less than $C_{j',chrend}$, the cell j is fully charged earlier, and therefore the effective charge capacity of the battery cluster is increased by $C_{j,disend}$. That is to say, the effective charge capacity of the battery cluster is increased by $\min[C_{j',chrend}, C_{j,disend}]$. This equalization method, which can improve the effective charge capacity of the battery cluster, may be referred to as charging equalization.

Similarly, the effective discharge capacity of the battery cluster may be improved by replacing the earliest fully discharged cell i or charging the cell alone, and quantitative analysis of the improvement of the effective discharge capacity may be realized through the capacity parameters determined in one embodiment.

If the cell i is replaced, that is, the cell i is replaced with a new healthy cell, the cell i' in the battery cluster after the replacement is the earliest fully discharged. During discharging of the battery cluster after the replacement, the cell i' can be fully discharged, that is, at this time, the capacity by which the cell i' may be further discharged when the discharging ending moment of the battery cluster is reached is zero. In other words, the battery cluster after the replacement may be discharged by an additional battery level of $C_{i',chrend}$ compared with the previous battery cluster, that is, the effective discharge capacity of the battery cluster can be increased by $C_{i',chrend}$.

Alternatively, when the cell i is still available, for example, when the health of the cell i still satisfies the use requirements, the cell i may not be replaced. At this time, the cell i may be charged to reduce the inconsistency between the cells in the battery cluster, thereby realizing equalization. Specifically, the cell i may be charged alone. For example, the battery cluster may be charged to the charging ending voltage of the battery cluster. At this time, the charge of the battery cluster ends. Then the cell i may be charged alone to an ending voltage of the cell i, so that an SOC of the cell i is $SOC_i=100\%$. During subsequent discharging of the battery cluster, the cell i may be discharged starting from the SOC of 100% until the battery cluster is fully discharged. In this case, the full discharge of the battery cluster depends on whether the capacity $C_{i,chrend}$ by which the cell i may be further charged when the charging ending moment of the battery cluster is reached or the capacity $C_{i',disend}$ by which the cell i' may be further discharged when the discharging ending moment of the battery cluster is reached is larger or smaller before the cell i is charged alone. If $C_{i,chrend}$ is greater than $C_{i',disend}$, the cell i' is fully discharged earlier, and therefore the effective discharge capacity of the battery cluster is increased by $C_{i',disend}$. Alternatively, if $C_{i,chrend}$ is less than $C_{i',disend}$, the cell i is fully discharged earlier, and therefore the effective discharge capacity of the battery cluster is increased by $C_{i,chrend}$. That is to say, the effective discharge capacity of the battery cluster is increased by $\min[C_{i,chrend}, C_{i',disend}]$. This equalization method, which can improve the effective discharge capacity of the battery cluster, may be referred to as discharging equalization.

The effective charge capacity of the battery cluster is a capacity by which the battery cluster that is fully discharged may be charged, and the effective discharge capacity of the battery cluster is a capacity by which the battery cluster that is fully charged may be discharged.

In addition, it should be noted that in some battery clusters, it is difficult to replace or charge/discharge a single cell. At this time, a battery module where an abnormal cell is located may be replaced or charged/discharged. The second fully charged cell j' or the second fully discharged cell i' that is determined is a cell other than the battery module where the abnormal cell is located. For example, the "earliest fully charged cell j' other than the charged cell j" is the earliest fully charged cell j' other than a battery module where the cell j is located, that is, the cell j and the cell j' are not in the same battery module. The "earliest fully discharged cell i' other than the discharged cell i" is the earliest fully discharged cell i' other than a battery module where the cell i is located, that is, the cell i and the cell i' are not in the same battery module.

Specific application examples of the present invention are disclosed as follows:

Example 1

A universal 2 parallel 12 series lithium iron phosphate cascade battery pack (including No. 1, No. 2, . . . , No. 11, and No. 12) with a capacity of 33.8 Ah is used as a test object. A charging ending voltage is 3.6 V, a discharging ending voltage is 2.7 V, a charging current is 1 C, and a discharging current is 0.2 C. A test device arbin evts 600 V/300 A and a temperature control box TU410-5 are used for the test, and a temperature range is −20° C. to +130° C. A temperature during the whole test is constant at 25° C.

A capacity parameter of each cell is obtained from dQ/dV. It is found through analysis that an internal resistance of the cell 2 goes wrong. The cell 2 is the earliest fully charged and fully discharged. Therefore, it is difficult to equalize the cell. In this case, the cell 2 needs to be replaced. In addition to the cell 2, the cell 5 is the earliest fully discharged, and may be further discharged by a capacity of $C_{5,disend}=4.141180371$ Ah at a discharging ending moment. Therefore, after the cell 2 is replaced, an effective discharge capacity of the lithium iron phosphate cascade battery pack is increased by 4.141180371 Ah. That is to say, the battery pack may be discharged by additional 4.141180371 Ah, and a discharge capacity of the battery pack is increased by 4.141180371/33.8=12.57%. Moreover, the cell 5 is the earliest fully charged other than the cell 2, and may be further charged by a capacity of $C_{5,chrend}=9.101463607$ Ah at a charging ending moment. Therefore, a charge capacity of the battery pack is increased by 9.101463607/33.8=26.96%.

Example 2

A State-Grid 1 parallel 16 series lithium iron phosphate cascade battery pack (including No. 1, No. 2, . . . , No. 15, and No. 16) with a capacity of 21.7 Ah is used as a test object. A charging ending voltage is 3.6 V, a discharging ending voltage is 2.7 V, a charging current is 0.7 C, and a discharging current is 0.7 C. A battery module charging/discharging test system of Qingdao Dikaron 100 V/300 A and an environmental simulation test box of Espec battery module are used for the test, and a temperature range is −40° C. to +100° C. A temperature during the whole test is constant at 25° C.

A capacity parameter of each cell is obtained from dQ/dV. It is found through analysis that the cell 13 is the earliest fully discharged, and may be further discharged by a capacity of $C_{13,disend}$=0 Ah at a discharging ending moment. In addition to the cell 13, the cell 16 is the earliest fully discharged, and the cell 16 may be further discharged by a capacity of $C_{16,disend}$=7.8 Ah at the discharging ending moment. A capacity by which the cell 13 may be further charged at a charging ending moment is $C_{13,chrend}$=9.165 Ah, which is greater than $C_{16,disend}$. It is found through calculation that after the cell 13 is equalized, that is, after the battery pack is charged to an ending voltage (at this time, the cell 13 is not fully charged and may be further charged by 9.165 Ah), the cell 13 is charged alone by an additional battery level greater than 7.8 Ah. For example, the cell 13 is charged to the ending voltage. At this time, the whole battery pack is discharged. An overall discharge capacity can be increased by 7.8 Ah, and a discharge capacity of the whole battery pack can be increased by 7.8/21.7=35.9%.

The method for quantitative analysis of battery performance provided in the embodiments of the present invention is described in detail above and the method may be implemented by a corresponding apparatus. The apparatus for quantitative analysis of battery performance provided in the embodiments of the present invention is described in detail below.

Figure 8:
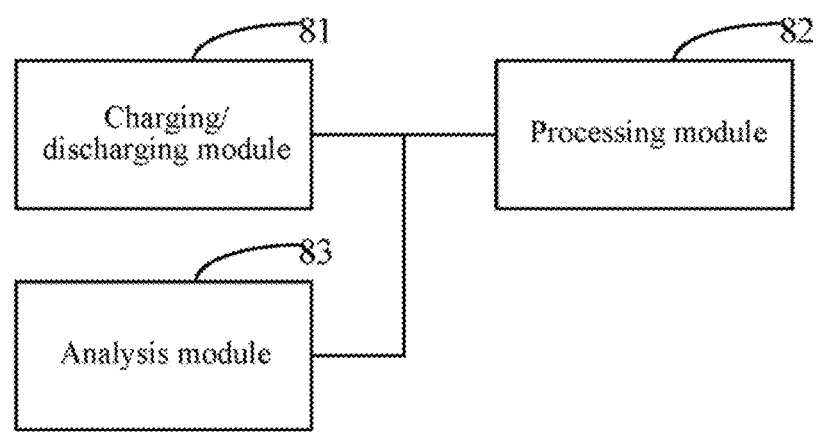
FIG. 8 is a schematic structural diagram of an apparatus for quantitative analysis of battery performance according to an embodiment of the present invention.

FIG. 8 is a schematic structural diagram of an apparatus for quantitative analysis of battery performance according to an embodiment of the present invention. As shown in FIG. 8, the apparatus for quantitative analysis of battery performance includes:
- a charging/discharging module 81, configured to perform a full charging/discharging process on a to-be-analyzed battery cluster, and determine differential capacities versus voltage of a plurality of cells in the battery cluster at different times, where a constant current exists in at least part of a time period of the full charging/discharging process;
- a processing module 82, configured to determine first times and first SOCs when the differential capacities versus voltage of the cells reach a first peak and second times and second SOCs when the differential capacities versus voltage of the cells reach a second peak, and determine capacity parameters of the cells according to the first times, the first SOCs, the second times, and the second SOCs, where the second SOCs are greater than the first SOCs; and
- an analysis module 83, configured to perform quantitative analysis on the battery cluster according to the capacity parameters of the plurality of cells.

Based on the above embodiment, the capacity parameter of a cell k in the battery cluster includes a capacity $C_{k,chrend}$ by which the cell k is to be further charged when a charging ending moment of the battery cluster is reached and a capacity $C_{k,disend}$ by which the cell k is to be further discharged when a discharging ending moment of the battery cluster is reached.

Based on the above embodiment, the quantitative analysis of the battery cluster by the analysis module 83 according to the capacity parameters of the plurality of cells includes:
- determining, according to a capacity by which each of the cells is to be further charged at a charging ending moment of the each cell, the earliest fully charged cell j in the battery cluster and the earliest fully charged cell j' other than the cell j, where
- if the cell j is replaced, an effective charge capacity of the battery cluster is increased by $C_{j',chrend}$; and
- if the cell j is discharged alone to an ending voltage after discharging of the battery cluster ends, the effective charge capacity of the battery cluster is increased by $\min[C_{j',chrend}, C_{j,disend}]$.

Based on the above embodiment, the quantitative analysis of the battery cluster by the analysis module 83 according to the capacity parameters of the plurality of cells includes:
- determining, according to a capacity by which each of the cells is to be further discharged at a discharging ending moment of the each cell, the earliest fully discharged cell i in the battery cluster and the earliest fully discharged cell i' other than the cell i, where
- if the cell i is replaced, an effective discharge capacity of the battery cluster is increased by $C_{i',disend}$; and
- if the cell j is charged alone to an ending voltage after charging of the battery cluster ends, the effective discharge capacity of the battery cluster is increased by $\min[C_{i',disend}, C_{i,chrend}]$.

Based on the above embodiment, in a case that the full charging/discharging process includes a full charging process, in the full charging process, the constant current exists in at least a time period from a charging beginning time to a largest one of the second times of the plurality of cells, and the full charging process begins when the battery cluster reaches a discharging ending voltage and ends when the battery cluster reaches a charging ending voltage; and
- in a case that the full charging/discharging process includes a full discharging process, in the full discharging process, the constant current exists in at least a time period from a smallest one of the second times of the plurality of cells to a discharging ending time, and the full discharging process begins when the battery cluster reaches the charging ending voltage and ends when the battery cluster reaches the discharging ending voltage.

Based on the above embodiment, the determination of capacity parameters of the cells by the processing module 82 according to the first times, the first SOCs, the second times, and the second SOCs includes:
- determining, according to a first $SOC_{k,I\ peak}$ and a second $SOC_{k,II\ peak}$ of the cell k in the battery cluster, a difference $\Delta SOC_k$ between the SOCs of the cell k when reaching the first peak and the second peak, where $\Delta SOC_k = SOC_{k,II\ peak} - SOC_{k,I\ peak}$; and
- determining a difference $\Delta Q_k$ between capacities of the cell k when reaching the first peak and the second peak, and determining a maximum capacity $Q_{kmax}$ of the cell k, where $Q_{kmax} = 100\%\ \Delta Q_k / \Delta SOC_k$.

Based on the above embodiment, the determination of the capacity parameters of the cells by the processing module 82 according to the first times, the first SOCs, the second times, and the second SOCs further includes:
- determining a charging ending $SOC_{k,end}$ of the cell k at the charging ending moment of the battery cluster according to a target time and a target SOC when the cell k reaches a target peak and the maximum capacity $Q_{kmax}$ of the cell k, where the target peak is the first peak or the second peak, and the target time is the corresponding first time or second time; and determining, based on the charging ending $SOC_{k,end}$ of the cell k, the capacity $C_{k,chrend}$ by which the cell k is to be further charged when the charging ending moment of the battery cluster is reached and the capacity $C_{k,disend}$ by which the cell k is to be further discharged when the discharging ending moment of the battery cluster is reached, where the capacity $C_{k,chrend}$ by which the cell is to be further charged at the charging ending moment and the capacity $C_{k,disend}$ by which the cell is to be further discharged at the discharging ending moment satisfy:

$$C_{k,chrend}=(1-SOC_{k,end})\times Q_{kmax};$$

$$C_{k,disend}=SOC_{k,end}\times Q_{kmax}-\int_{t_{k,begin}}^{t_{k,end}} I\, dt.$$

where $t_{k,begin}$ represents a beginning time of the full charging/discharging process of the cell k, $t_{k,end}$ represents an ending time of the full charging/discharging process of the cell k, and I represents a current value in the full charging/discharging process.

Based on the above embodiment, the determination of the capacity parameters of the cells by the processing module 82 according to the first times, the first SOCs, the second times, and the second SOCs further includes:

determining a charge capacity $C_{k,charge}$ of the cell k and a discharge capacity $C_{k,discharge}$ of the cell k, where the charge capacity $C_{k,charge}$ and the discharge capacity $C_{k,discharge}$ satisfy:

$$C_{k,charge}=\int_{t_{k,begin}}^{t_{k,end}} I\, dt+(1-SOC_{k,end})\times Q_{kmax};$$

$$C_{k,discharge}=SOC_{k,end}\times Q_{kmax}.$$

Based on the above embodiment, in a case that the full charging/discharging process includes the full charging process, the charging ending $SOC_{k,end}$ of the cell k satisfies:

$$SOC_{k,end}=SOC_{k,T\,peak}+\int_{t_{k,T\,peak}}^{t_{k,chrend}} I\, dt/Q_{kmax}.$$

in a case that the full charging/discharging process includes the full discharging process, the charging ending $SOC_{k,end}$ of the cell k satisfies:

$$SOC_{k,end}=SOC_{k,T\,peak}+\int_{t_{k,disbegin}}^{t_{k,T\,peak}} I\, dt/Q_{kmax}.$$

where $SOC_{k,T\,peak}$ represents an SOC of the target peak, $t_{k,T\,peak}$ represents the target time of the target peak, $t_{k,chrend}$ represents a charging ending time of the cell k, and $t_{k,disbegin}$ represents a discharging beginning time of the cell k.

In addition, an embodiment of the present invention further provides an electronic device, including a bus, a transceiver, a memory, a processor, and a computer program stored in the memory and runnable on the processor. The transceiver, the memory, and the processor are connected through the bus. When the computer program is executed by the processor, all processes of the embodiment of the method for quantitative analysis of battery performance are implemented, and the same technical effects can be achieved. To avoid repetition, details are not described herein again.

Figure 9:
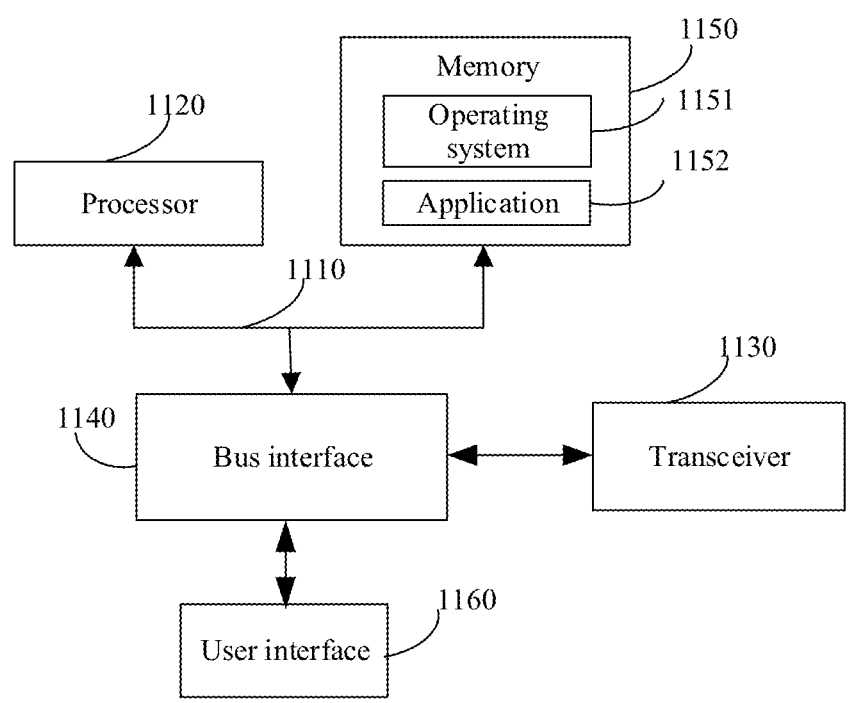
FIG. 9 is a schematic structural diagram of an electronic device for performing the method for quantitative analysis of battery performance according to an embodiment of the present invention.

Specifically, referring to FIG. 9, an embodiment of the present invention further provides an electronic device. The electronic device includes a bus 1110, a processor 1120, a transceiver 1130, a bus interface 1140, a memory 1150, and a user interface 1160.

In one embodiment of the present invention, the electronic device further includes a computer program stored in the memory 1150 and runnable on the processor 1120. When the computer program is executed by the processor 1120, all processes of the embodiment of the method for quantitative analysis of battery performance are implemented.

The transceiver 1130 is configured to receive and transmit data under control of the processor 1120.

In one embodiment of the present invention, a bus architecture is represented by the bus 1110. The bus 1110 may include any number of interconnected buses and bridges, and the bus 1110 connects together various circuits including one or more processors represented by the processor 1120 and memories represented by the memory 1150.

The bus 1110 is one or more of any type of bus structures in a plurality of types of bus structures, including a memory bus and a memory controller, a peripheral bus, an accelerate graphical port (AGP), a processor, or a local bus using any bus structure in various bus architectures. As an example rather than a limitation, such architecture includes an industry standard architecture (ISA) bus, a micro channel architecture (MCA) bus, an enhanced ISA (EISA) bus, a video electronics standards association (VESA) bus, and a peripheral component interconnect (PCI) bus.

The processor 1120 may be an integrated circuit chip and has a signal processing capability. During the implementation, each step of the above method embodiment may be completed by using an integrated logic circuit of hardware in the processor or an instruction in a form of software. The above processor includes a general processor, a central processing unit (CPU), a network processor (NP), a digital signal processor (DSP), an application specific integrated circuit (ASIC), a field programmable gate array (FPGA), a complex programmable logic device (CPLD), a programmable logic array (PLA), a microcontroller unit (MCU) or other programmable logic devices, a discrete gate, a transistor logic device, and a discrete hardware component. The processor may implement or execute various methods, steps, and logic block diagrams disclosed in the embodiments of the present invention. For example, the processor may be a single cell processor or a multi-core processor, and may be integrated on a single chip or located on a plurality of different chips.

The processor 1120 may be a microprocessor or any conventional processor. The steps of the method disclosed in combination with the embodiments of the present invention may be directly performed by a hardware decoding processor, or may be performed by a combination of hardware and software modules in the decoding processor. The software module may be located in a readable storage medium known in the art, such as a random access memory (RAM), a flash memory, a read only memory (ROM), a programmable ROM (PROM), an erasable PROM (EPROM), or a register. The readable storage medium is located in the memory, and the processor reads information in the memory and completes the steps of the above method in combination with hardware of the processor.

The bus 1110 may further connect together various other circuits such as a peripheral device, a voltage regulator, or a power management circuit. The bus interface 1140 provides an interface between the bus 1110 and the transceiver 1130, which is well known in the art. Therefore, the above is not further described in one embodiment of the present invention.

The transceiver 1130 may be one element or a plurality of elements, such as a plurality of receivers and transmitters, which provides a unit for communication with various other devices on a transmission medium. For example, the transceiver 1130 receives external data from the other devices, and the transceiver 1130 is configured to transmit data processed by the processor 1120 to the other devices.

Depending on properties of a computer system, a user interface 1160 such as a touch screen, a physical keyboard, a display, a mouse, a speaker, a microphone, a trackball, a joystick, and a stylus may be further provided.

It should be understood that in one embodiment of the present invention, the memory 1150 may further include memories remotely disposed relative to the processor 1120, which may be connected to a server via a network. One or more parts of the above network may be an ad hoc network, an intranet, an extranet, a virtual private network (VPN), a local area network (LAN), a wireless local area network (WLAN), a wide area network (WAN), a wireless wide area network (WWAN), a metropolitan area network (MAN), the Internet, a public switched telephone network (PSTN), a plain old telephone service (POTS) network, a cellular telephone network, a wireless network, a Wi-Fi network, and a combination of two or more of the above networks. For example, the cellular telephone network and the wireless network may be global systems for mobile communications (GSM), code division multiple access (CDMA) systems, world interoperability for microwave access (WiMAX) systems, general packet radio service (GPRS) systems, broadband code division multiple access (WCDMA) systems, long-term evolution (LTE) systems, LTE frequency division duplex (FDD) systems, LTE time division duplex (TDD) systems, LTE-advanced (LTE-A) systems, universal mobile telecommunication systems (UMTS), enhanced mobile broadband (eMBB) systems, massive machine type of communication (mMTC) systems, ultra reliable low latency communications (uRLLC) systems, or the like.

It should be noted that, the memory 1150 in one embodiment of the present invention may be a volatile memory or a non-volatile memory, or may include both a volatile memory and a non-volatile memory. The non-volatile memory may include a read-only memory (ROM), a programmable ROM (PROM), an erasable PROM (EPROM), an electrically EPROM (EEPROM), or a flash memory.

The volatile memory may include a random access memory (RAM) that serves as an external cache. By way of example but not limitation, many forms of RAMs are available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The memory 1150 of the electronic device described in one embodiment of the present invention includes but is not limited to the above memories and any other suitable type of memories.

In one embodiment of the present invention, the memory 1150 stores the following elements of an operating system 1151 and an application program 1152: an executable module, a data structure, or a subset thereof, or an extended set thereof.

Specifically, the operating system 1151 includes various system programs, such as a framework layer, a cell library layer, and a driver layer, which are configured to implement various basic services and processing a task based on hardware. The application 1152 includes various applications such as a media player and a browser for implementing various application services. A program implementing the method of the embodiments of the present invention may be included in the application 1152. The application 1152 includes applets, objects, components, logic, data structures, and other computer system executable instructions for performing specific tasks or implementing specific abstract data types.

In addition, an embodiment of the present invention further provides a computer-readable storage medium storing a computer program. When the computer program is executed by a processor, all processes of the embodiment of the method for quantitative analysis of battery performance are implemented, and the same technical effects can be achieved. To avoid repetition, details are not described herein again.

The computer-readable storage medium includes permanent and non-permanent, removable and non-removable media, which are tangible devices that can retain and store instructions for use by an instruction execution device. The computer-readable storage medium includes an electronic storage device, a magnetic storage device, an optical storage device, an electromagnetic storage device, a semiconductor storage device, and any suitable combination of the above. The computer-readable storage medium includes a phase-change random access memory (PRAM), a static random access memory (SRAM), a dynamic random access memory (DRAM), other types of random access memories (RAM), a read-only memory (ROM), a non-volatile RAM (NVRAM), an electrically erasable programmable RAM (EEPROM), a flash memory, or other memory technologies, a compact disk ROM (CD-ROM), a digital versatile disc (DVD) or other optical storages, a magnetic cassette tape storage, a magnetic tape disc storage or other magnetic storage devices, a memory stick, a mechanical encoding apparatus (such as a punched card or a convex structure in a groove recorded with instructions), or any other non-transmission media that can be used to store information accessible by a computing device. As defined in the embodiments of the present invention, the computer-readable storage medium does not include temporary signals, such as radio waves or other electromagnetic waves that propagate freely, electromagnetic waves that propagate through waveguides or other transmission media (such as optical pulses passing through optical fiber cables), or electrical signals transmitted through guide wires.

The foregoing descriptions are merely specific implementations of the present invention, but are not intended to limit the protection scope of the present invention. Any variation or alternative technical solutions readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for quantitative analysis of battery performance, comprising:
   performing a full charging process or a full discharging process on a battery cluster, and determining differential capacities versus voltage of a plurality of cells in the battery cluster at different times, wherein a constant current exists in at least part of a time period of the full charging process or the full discharging process;
   determining first times and first states of charge (SOC) when the differential capacities versus voltage of the cells reach a first peak and second times and second SOCs when the differential capacities versus voltage of the cells reach a second peak, and determining capacity parameters of the cells according to the first times, the first SOCs, the second times, and the second SOCs, wherein the second SOCs are greater than the first SOCs; and performing quantitative analysis on the battery cluster according to the capacity parameters of the plurality of cells, wherein when the full charging/discharging process comprises a full charging process, in the full charging process the constant current exists in at least a time period from a charging beginning time to a largest one of the second times of the plurality of cells, and the full charging process begins when the battery cluster reaches a discharging ending voltage and ends when the battery cluster reaches a charging ending voltage;

wherein when the full charging/discharging process comprises a full discharging process, in the full discharging process the constant current exists in at least a time period from a smallest one of the second times of the plurality of cells to a discharging ending time, and the full discharging process begins when the battery cluster reaches the charging ending voltage and ends when the battery cluster reaches the discharging ending voltage; and wherein the determining the capacity parameters of the cells according to the first times, the first SOCs, the second times, and the second SOCs comprises:

determining, according to a first $SOC_{k,I\ peak}$ and a second $SOC_{k,II\ peak}$ of the cell k in the battery cluster, a difference $\Delta SOC_k$ between the SOCs of the cell k when reaching the first peak and the second peak, wherein $\Delta SOC_k = SOC_{k,II\ peak} - SOC_{k,I\ peak}$; and determining a difference $\Delta Q_k$ between capacities of the cell k when reaching the first peak and the second peak, and determining a maximum capacity $Q_{kmax}$ of the cell k, wherein $Q_{kmax} = 100\% \times \Delta Q_k / \Delta SOC_k$.

2. The method according to claim 1, wherein the capacity parameter of a cell k in the battery cluster comprises a capacity $C_{k,chrend}$ by which the cell k is to be further charged when a charging ending moment of the battery cluster is reached and a capacity $C_{k,disend}$ by which the cell k is to be further discharged when a discharging ending moment of the battery cluster is reached.

3. The method according to claim 2, wherein the performing quantitative analysis on the battery cluster according to the capacity parameters of the plurality of cells comprises:

determining, according to a capacity by which each of the cells is to be further charged at a charging ending moment of the each cell, the earliest fully charged cell j in the battery cluster and the earliest fully charged cell j' other than the cell j, wherein if the cell j is replaced, an effective charge capacity of the battery cluster is increased by $C_{j',chrend}$; and if the cell j is discharged alone to an ending voltage after discharging of the battery cluster ends, the effective charge capacity of the battery cluster is increased by $\min [C_{j',chrend}, C_{j,disend}]$.

4. The method according to claim 2, wherein the performing quantitative analysis on the battery cluster according to the capacity parameters of the plurality of cells comprises:

determining, according to a capacity by which each of the cells is to be further discharged at a discharging ending moment of the each cell, the earliest fully discharged cell i in the battery cluster and the earliest fully discharged cell i' other than the cell i, wherein if the cell i is replaced, an effective discharge capacity of the battery cluster is increased by $C_{i',disend}$; and if the cell j is charged alone to an ending voltage after charging of the battery cluster ends, the effective discharge capacity of the battery cluster is increased by $\min [C_{i',disend}, C_{i,chrend}]$.

5. The method according to claim 1, wherein the determining capacity parameters of the cells according to the first times, the first SOCs, the second times, and the second SOCs further comprises:

determining a charging ending $SOC_{k,end}$ of the cell k at the charging ending moment of the battery cluster according to a target time and a target SOC when the cell k reaches a target peak and the maximum capacity $Q_{kmax}$ of the cell k, wherein the target peak is the first peak or the second peak, and the target time is the corresponding first time or second time; and determining, based on the charging ending $SOC_{k,end}$ of the cell k, the capacity $C_{k,chrend}$ by which the cell k is to be further charged when the charging ending moment of the battery cluster is reached and the capacity $C_{k,disend}$ by which the cell k is to be further discharged when the discharging ending moment of the battery cluster is reached, wherein the capacity $C_{k,chrend}$ by which the cell is to be further charged at the charging ending moment and the capacity $C_{k,disend}$ by which the cell is to be further discharged at the discharging ending moment satisfy:

$$C_{k,chrend} = (1 - SOC_{k,end}) \times Q_{kmax};$$

$$C_{k,disend} = SOC_{k,end} \times Q_{kmax} - \int_{t_{k,begin}}^{t_{k,end}} I dt,$$

wherein $t_{k,begin}$ represents a beginning time of the full charging/discharging process of the cell k, $t_{k,end}$ represents an ending time of the full charging/discharging process of the cell k, and I represents a current value in the full charging/discharging process.

6. The method according to claim 5, wherein the determining capacity parameters of the cells according to the first times, the first SOCs, the second times, and the second SOCs further comprises:

determining a charge capacity $C_{k,charge}$ of the cell k and a discharge capacity $C_{k,discharge}$ of the cell k, wherein the charge capacity $C_{k,charge}$ and the discharge capacity $C_{k,discharge}$ satisfy:

$$C_{k,charge} = \int_{t_{k,begin}}^{t_{k,end}} I dt + (1 - SOC_{k,end}) \times Q_{kmax};$$

$$C_{k,discharge} = SOC_{k,end} \times Q_{kmax}.$$

7. The method according to claim 5, wherein in a case that the full charging/discharging process comprises the full charging process, the charging ending $SOC_{k,end}$ of the cell k satisfies:

$$SOC_{k,end} = SOC_{k,T\ peak} + \int_{t_{k,T\ peak}}^{t_{k,chrend}} I dt / Q_{kmax}; \text{ and}$$

in a case that the full charging/discharging process comprises the full discharging process, the charging ending $SOC_{k,end}$ of the cell k satisfies:

$$SOC_{k,end} = SOC_{k,T\ peak} + \int_{t_{k,disbegin}}^{t_{k,T\ peak}} I dt / Q_{kmax},$$

wherein $SOC_{k,T\ peak}$ represents an SOC of the target peak, $t_{k,T\ peak}$ represents the target time of the target peak, $t_{k,chrend}$ represents a charging ending time of the cell k, and $t_{k,disbegin}$ represents a discharging beginning time of the cell k.

8. An apparatus for quantitative analysis of battery performance, comprising:

a charging/discharging module, configured to perform a full charging process or a full discharging process on a battery cluster, and determine differential capacities versus voltage of a plurality of cells in the battery cluster at different times, wherein a constant current exists in at least part of a time period of the full charging process or the full discharging process;

a processing module, configured to determine first times and first states of charge (SOC) when the differential capacities versus voltage of the cells reach a first peak and second times and second SOCs when the differential capacities versus voltage of the cells reach a second peak, and determine capacity parameters of the cells according to the first times, the first SOCs, the second times, and the second SOCs, wherein the second SOCs are greater than the first SOCs; and an analysis module, configured to perform quantitative analysis on the battery cluster according to the capacity parameters of the plurality of cells, wherein when the full charging/discharging process comprises a full charging process, in the full charging process the constant current exists in at least a time period from a charging beginning time to a largest one of the second times of the plurality of cells, and the full charging process begins when the battery cluster reaches a discharging ending voltage and ends when the battery cluster reaches a charging ending voltage;

wherein when the full charging/discharging process comprises a full discharging process, in the full discharging process the constant current exists in at least a time period from a smallest one of the second times of the plurality of cells to a discharging ending time, and the full discharging process begins when the battery cluster reaches the charging ending voltage and ends when the battery cluster reaches the discharging ending voltage; and wherein the determining capacity parameters of the cells according to the first times, the first SOCs, the second times, and the second SOCs comprises:

determining, according to a first $SOC_{k,I\ peak}$ and a second $SOC_{k,II\ peak}$ of the cell k in the battery cluster, a difference $\Delta SOC_k$ between the SOCs of the cell k when reaching the first peak and the second peak, wherein $\Delta SOC_k = SOC_{k,II\ peak} - SOC_{k,I\ peak}$; and determining a difference $\Delta Q_k$ between capacities of the cell k when reaching the first peak and the second peak, and determining a maximum capacity $Q_{kmax}$ of the cell k, wherein $Q_{kmax} = 100\% \times \Delta Q_k / \Delta SOC_k$.

9. An electronic device, comprising a bus, a transceiver, a memory, a processor, and a computer program stored in the memory and runnable on the processor, wherein the transceiver, the memory, and the processor are connected through the bus, and when the computer program is executed by the processor, the steps in the method for quantitative analysis of battery performance according to claim 1 are implemented.

10. A non-transitory tangible computer-readable storage medium, storing a computer program therein, wherein when the computer program is executed by a processor, the steps in the method for quantitative analysis of battery performance according to claim 1 are implemented.

* * * * *